No. 871,144. PATENTED NOV. 19, 1907.
F. A. REINHARD.
EYEGLASS OR SPECTACLE CASE.
APPLICATION FILED DEC. 12, 1905.
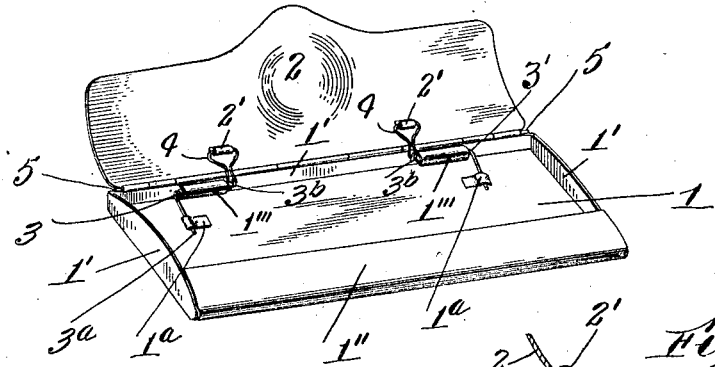
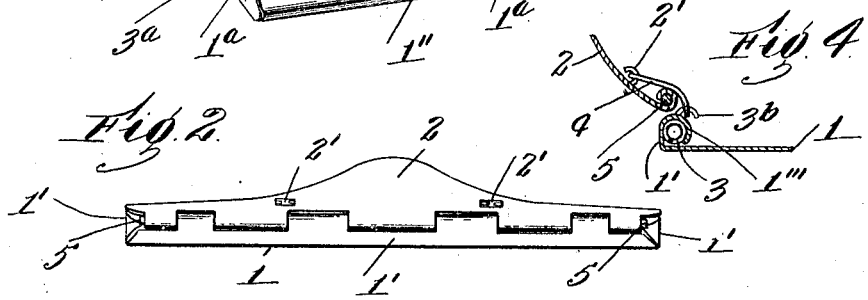
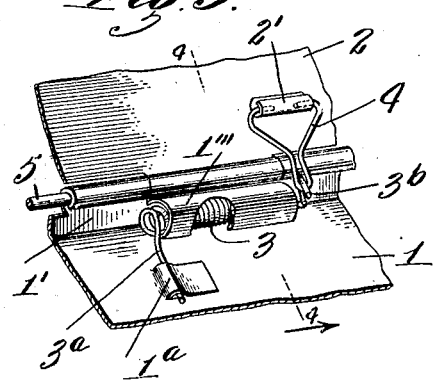
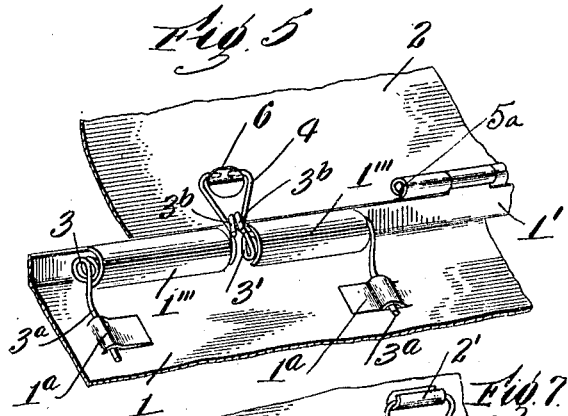
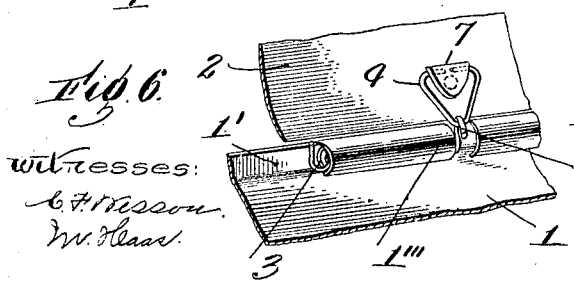

UNITED STATES PATENT OFFICE.

FRANK A. REINHARD, OF EAST WEYMOUTH, MASSACHUSETTS, ASSIGNOR TO AMERICAN OPTICAL COMPANY, A CORPORATION OF MASSACHUSETTS.

EYEGLASS OR SPECTACLE CASE.

No. 871,144.

Specification of Letters Patent.

Patented Nov. 19, 1907.

Application filed December 12, 1905. Serial No. 291,417.

*To all whom it may concern:*

Be it known that I, FRANK A. REINHARD, a citizen of the United States, residing at East Weymouth, in the county of Norfolk and State of Massachusetts, have invented certain new and useful Improvements in Eyeglass or Spectacle Cases, of which the following is a specification.

My invention relates to new and useful improvements in spring-lid boxes, or eyeglass or spectacle cases, and to that class of boxes or cases, which has a spring actuated cover or lid, which is held in its closed, or open position.
The object of my invention is to improve upon the construction of spring-lid boxes, or eyeglass or spectacle cases of the class referred to, and to provide a spring-lid box, or eyeglass or spectacle case of simple construction, and effective in operation.

My invention consists in certain novel features of construction of my improvements as will be hereinafter fully described.

Referring to the drawing:—Figure 1 is a perspective view of a spring-lid box, or eyeglass or spectacle case embodying my improvements, with the cover open. Fig. 2 is a rear view of the box or case shown in Fig. 1, with the cover closed. Fig. 3 shows, on an enlarged scale, a detached portion of the box or case shown in Fig. 1, to more clearly illustrate the spring attachment. Fig. 4 is a section, on line 4, 4, Fig. 3, looking in the direction of the arrow, same figure. Fig. 5 shows a modified construction of the spring attachment. Fig. 6 shows another modified construction of the spring attachment, and, Fig. 7 shows another modified construction of the spring attachment.
In the accompanying drawing, the spring-lid box, or eyeglass or spectacle case is shown without any covering or lining, and consists of two members or parts, preferably made of metal, a body portion 1, having in this instance the vertically extending back and ends 1', and the inwardly extending flange 1'' on its front edge; and the cover or lid 2, hinged to the body portion 1 upon the rear edge thereof, as is customary in the class of eyeglass or spectacle cases above referred to.

In connection with the body portion 1, and cover 2 of the case, I employ a spring attachment combined therewith, to hold the cover closed, or to hold it open.

My spring attachment consists of a helically coiled wire spring, which in this instance is combined with and attached to the body portion 1 of the case, and is preferably inclosed in a pocket or sheath, which is preferably formed from a part of the body of the case, on the rear edge thereof, which is bent or rolled into tubular shape, to contain and conceal the coiled spring. One end of the spring is attached in any suitable manner to the body of the case, or it may be left free to be held against the back lip on the body of the case, and the other end of the spring is preferably formed into a hook, which is attached to a wire loop, or link, attached to the cover.

In Fig. 1 is shown two independent helically coiled wire springs 3, and 3', in this instance coiled in opposite directions, and which are separated from each other, and located, one near each end of the case, which leaves a free open space in the center of the case, where room is required for the bridge of a spectacle, or the spring of an eyeglass. Each spring 3, and 3', in this instance extends within and is inclosed by a pocket or sheath 1''', of tubular shape, which is preferably formed from the rear part or edge of the body 1, by bending or rolling over the same, see Figs. 3, and 4. One end, as 3ª, of each coiled spring 3, and 3', Fig. 1, may extend out at right angles to the coiled part of the spring, and be attached to the body portion 1 of the case, in this instance by cutting out a lip or tongue 1ª from the body portion, and bending it up to insert the end of the wire under it, and then bending it down to extend in a plane with the body portion, to hold the end as shown in the drawing. The other end of the wire springs 3, and 3', is preferably formed into a hook 3ᵇ, to engage a loop or link 4, preferably of wire, which is attached to the cover 2 of the case in any suitable manner and forms a connection between the cover and the actuating spring.

In Fig. 1, a portion 2' on the cover 2 is cut through and pressed inwardly, forming an eye or loop, to receive the inwardly extending ends at the upper end of the loop 4, as shown in Fig. 3.

In Figs. 1, and 2, there is shown a continuous wire 5, extending from one end of the case to the other, and forming in this instance the hinge wire, and the inner edge of the body portion 1, and of the cover 2, are bent or rolled over to form pockets for the hinge wire 5, so as to present a uniform appearance on the rear edge of the case, as shown in Fig. 2.

The surplus material on the rear edge of the body 1, not used in inclosing the hinge wire, is used for the pockets 1′′′, for the springs 3, and 3′.

Fig. 5 shows a modified construction of the spring attachment shown in Fig. 1. In said Fig. 5, the two coiled springs 3, and 3′, corresponding to the springs 3, and 3′, Fig. 1, are located at the central portion of the case, contiguous to each other, and one coil is wound in one direction, and the other in the other direction, so that the spring action of each will correspond. In Fig. 5 is also shown a modified way of attaching the loop 4 to the cover 2. A lip or tongue 6 is cut out of the cover 2, and then bent backwardly to receive the ends of the loop 4, and pressed against the body of the cover on the inside thereof.

In Fig. 5, the hinge wire is not continuous, but is made in sections, only one section 5ª is shown. It will be understood that the hinge wire may be continuous, or in sections, as desired.

Fig. 6 shows another modified construction. In said figure only one spring is preferably shown at the central portion of the case, instead of the two springs shown in Fig. 5, and one end of the spring, instead of being attached to the body of the case, as shown in the other figures, bears against the vertically extending lip 1′ at the rear edge of the body portion 1.

The construction of the spring, shown in Fig. 6, with one end bearing against the back of the case, may be used in case one spring is used, or two springs are used, as above described. In said Fig. 6 is also shown a modified construction of the loop attachment to the cover 2. A separate piece 7 is secured, by a rivet or otherwise, to the inside of the cover, to hold the inwardly extending ends, at the upper end of the loop, between said piece and the cover.

Fig. 7 shows another modified construction. In said figure, a rod or wire 8 is used instead of the pocket or sheath 1′′′ shown in the other figures, to hold the coil wire 3 in proper operative position, at the rear of the case. The wire 8 may be secured at each end to the bottom of the case in any suitable way, or may be secured to the rear edge of the case, and in practice the spring 3 will preferably be placed upon the wire 8, or the wire 8 inserted through the spring before the wire is attached to the case.

It will be understood that the details of construction of my improvements may be varied if desired.

Having thus described my invention, what I claim as new and desire to secure by Letters Patent is:—

1. A spring lid box or case, comprising the body and cover hinged together, a loop or link attached to the cover, and a helically coiled spring extending within a pocket or sheath formed from the rear part or edge of the body, said spring attached at one end to said loop and bearing at its other end against the base of the box or case.

2. A spring-lid box or case, comprising a body and cover hinged together, a portion of said cover pressed inwardly to form an eye, a loop or link attached at one end to said eye, a lip or tongue struck up from the body portion and a helically coiled spring attached at one end to the loop and at the other end to the lip or tongue.

3. A spring-lid box or case, comprising a body and cover hinged together, a portion of said cover pressed inwardly to form an eye, a lip or tongue struck up from the body portion, a helically coiled spring attached at one end to the lip or tongue, and means connecting the other end of said spring with said eye.

4. A spring-lid box or case, comprising a body and cover hinged together, a portion of said cover pressed inwardly to form an eye, a loop or link attached at one end to said eye, a lip or tongue struck up from the body portion, a helically coiled spring attached at one end to the loop and at the other end to the lip or tongue, and a sheath or pocket formed from the body of the case for containing said spring.

FRANK A. REINHARD.

Witnesses:
CHANNING M. WELLS,
H. C. CADY.